Oct. 10, 1961 R. RAPACZ 3,004,251

DIGITAL-TO-ANALOGUE CONVERTER

Filed Oct. 10, 1957 2 Sheets-Sheet 1

INVENTOR
RAYMOND RAPACZ
BY
ATTORNEY

DIGITAL-TO-ANALOGUE CONVERTER

Filed Oct. 10, 1957

| COILS | | POLE |
|---|---|---|
| W1N-W5S | ON | P1 |
| W2N-W6S | " | P2 |
| W3N-W7S | " | P3 |
| W4N-W8S | " | P4 |
| W5N-W1S | " | P5 |
| W6N-W2S | " | P6 |
| W7N-W3S | " | P7 |
| W8N-W4S | " | P8 |

INVENTOR
RAYMOND RAPACZ
BY
[signature]
ATTORNEY

United States Patent Office 3,004,251
Patented Oct. 10, 1961

3,004,251
DIGITAL-TO-ANALOGUE CONVERTER
Raymond Rapacz, Sea Cliff, N.Y., assignor to Sperry Rand Corporation, a corporation of Delaware
Filed Oct. 10, 1957, Ser. No. 689,411
8 Claims. (Cl. 340—347)

This invention relates to converting systems and more particularly to digital-to-analogue conversion.

It is often necessary to obtain a position indication which is an analogue of particular digital information, for example, a visual position display which is a function of certain digital information.

In accordance with one embodiment of the invention, one of a plurality of response sections of a receiver is activated in response to a particular permutation of the digits of one group of digital information bits or digits, and the activated section is scanned or traversed in response to the permutation of the bits of another group of digital information bits. The receiver provides a "coarse" indication of the arrangement of the bits of both groups of bits, and a "fine" indication is provided by the scanning scheme. In a specific form of the invention, a common scanning element with a plurality of indicators scans all the response sections simultaneously in response to the signals of the second group. However, only an indicator along an activated section will give a distinctive indication of the scanning result.

It is, therefore, an object of the present invention to provide a novel and relatively simple digital-to-analogue converter.

Another object of this invention is to provide novel and relatively simple apparatus for converting digital information to an analogous visual display.

Further objects and advantages of the present invention will be apparent from the following description, reference being had to the accompanying drawings wherein a preferred form of the invention is illustrated.

Figure 1:
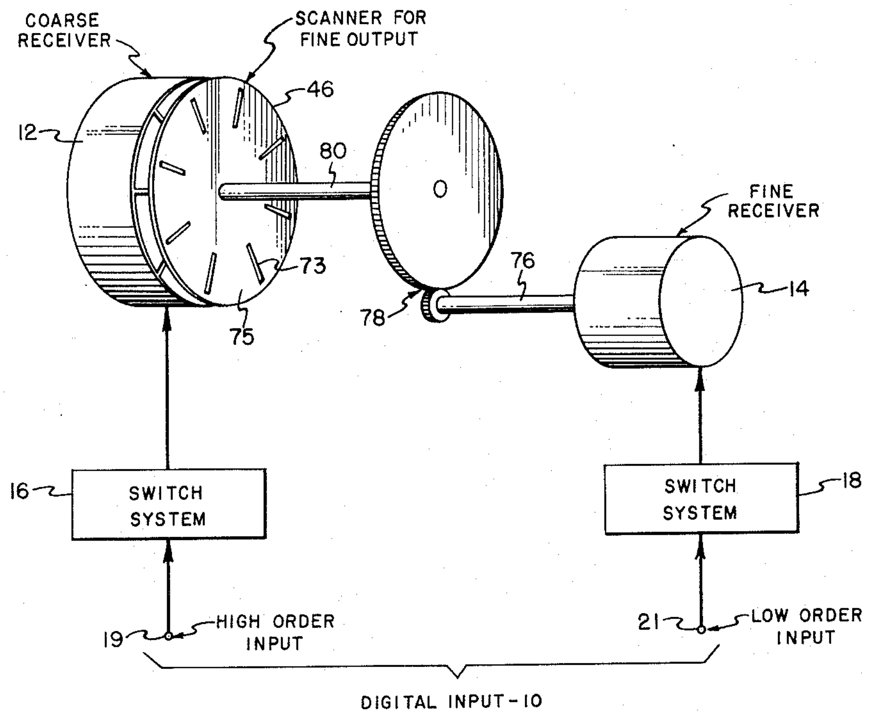
FIG. 1 is a block diagram of one form of the invention.

The digital to analogue converting apparatus shown in the drawing includes a digital input 10 (FIGS. 1 and 4) which controls two receivers 12 and 14 through switching systems 16 and 18 respectively. While not to be restricted thereto, the particular apparatus shown is suited to the conversion of six-digit natural binary coded signals to a corresponding analogue.

Included in the input are terminals T1, T2, T3, T4, T5 and T6, through which the respective signals or bits of a six-bit binary code are received from a source (not shown), for example a binary counter. The terminal number indicates the respective order or relative digital significance of the bit received by it. Thus, T6 receives the most significant digit receivable by the input, while T1 receives the least significant digit. The three most significant digits represented by terminals T6, T5 and T4, and the apparatus responsive thereto will, for convenience, be referred to as "high order" digits, "high order" apparatus, etc. Correspondingly, digits arriving at terminals T3, T2 and T1 and the apparatus responsive thereto will be referred to as the "low order" digits, "low order" apparatus, etc. Presence of a signal at an input terminal denotes 1, while absence of signal denotes 0.

The particular switching systems shown as examples, are known as relay transfer trees, and each includes three relays, each energized from a different input terminal. In the high order switching system 16, the relays are numbered R6, R5 and R4, and are connected to be energized from the high order input terminals T6, T5 and T4 respectively, while those in the low order switching system are referenced as R3, R2 and R1, and are connected to be operated from the respective low order input terminals T3, T2 and T1. All the relays are shown in the unoperated condition, which obtains when there is no signal at any of the input terminals.

Receiver 12 includes a course or path divided into a plurality of response sections, one for each different permutation of the high order digits, each of which sections may be selectively activated, for example, by light, in response to a different one of the permutations of the digital bits at the high order input 19. The receiver 14 has an output with a plurality of response positions, each responsive to a different one of the permutations of the low order digits. Responses of receiver 14 are employed to scan whichever response section of receiver 12 is activated.

Figures 2, 3, 4, 5:
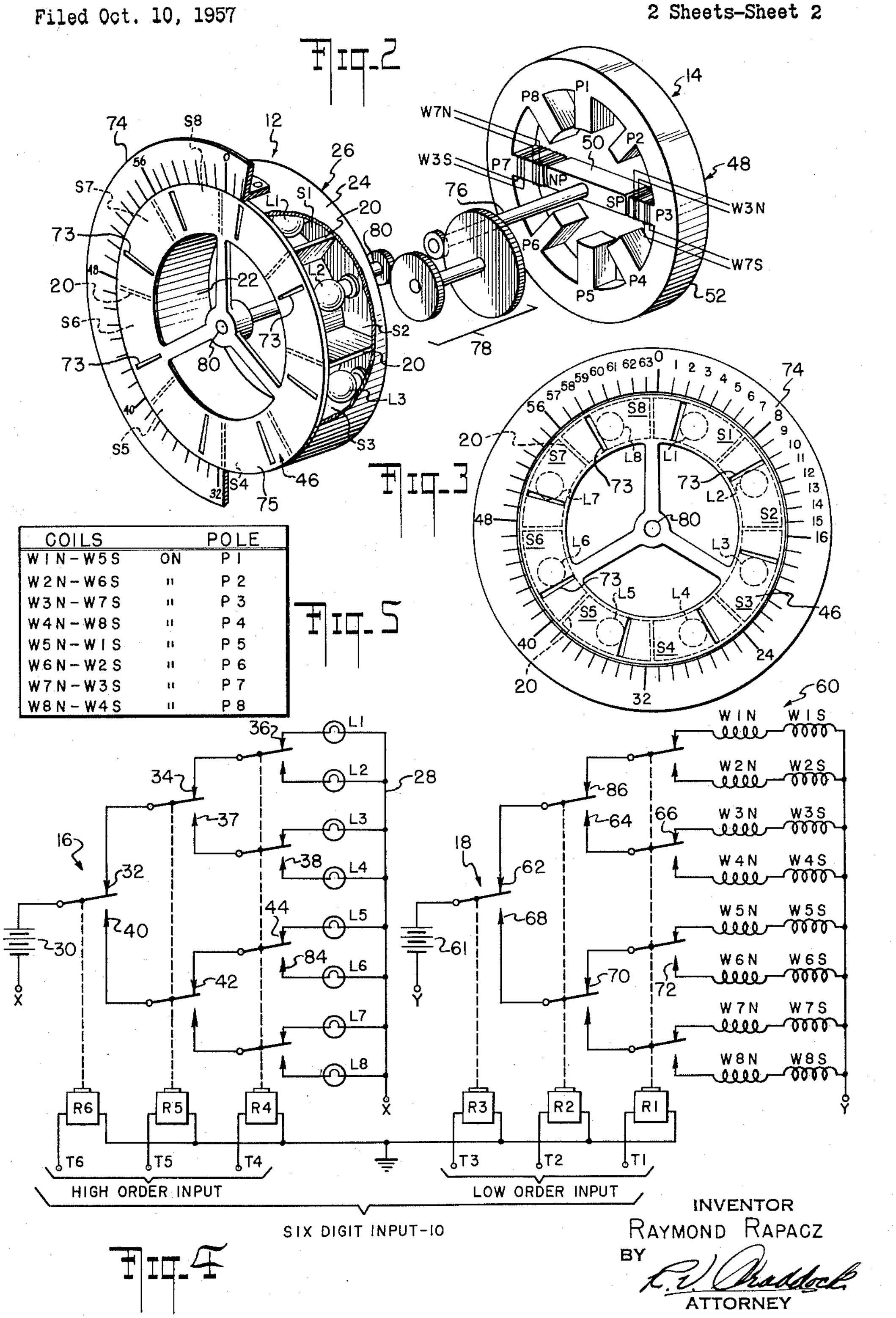
FIG. 2 is a view illustrating one form of the receivers and scanner shown in FIG. 1.
FIG. 3 is another view of the course receiver, and of the scanner.
FIG. 4 is a diagram showing an electrical circuit applicable to the apparatus shown in FIGS. 1, 2 and 3 ($x$—$x$ denote common points and $y$—$y$ are common points)
FIG. 5 is a table indicating which poles of the "fine" receiver in FIG. 2 carry the pole winding or coils shown in the circuit of FIG. 4.

In the example shown in FIGS. 2 and 3, eight stationary response sections S1, S2, S3, S4, S5, S6, S7 and S8 are defined along a circular course by radial partitions 20 which divide the space between concentric circular walls 22 and 24 of an open front hollow toroidal housing 26 into eight chambers shielded from each other by the partitions 20, each chamber constituting a response section. In order to activate each response section, each chamber has disposed therein an electric lamp bulb as indicated at L1, L2, L3, L4, L5, L6, L7 and L8. Corresponding lamps and sections bear the same number, for example, lamp L1 is in section S1, lamp L2 is in section S2, etc. A lamp energizing circuit 28 shows the lamps connected to the output of switching system 16, which selectively supplies current from a source 30, such as a battery, to the proper lamp whose position represents the particular digit arrangement at the high order input terminals. A different lamp is lit in response to each different permutation of the digits at the high order input terminals.

Due to their position in a six-bit natural binary code, the high order digits received by input terminals T6, T5 and T4 have the following decimal equivalents in the presence of a signal: T6—32; T5—16; and T4—8. Thus absence of a signal at all high order input terminals should indicate decimal zero for the high order digits and activate a particular one of the response sections, which is S1 in the example shown, while presence of a signal at only T4 should indicate the decimal equivalent 8 and activate the next section S2. In similar manner presence of signal at only T5 should indicate decimal 16 and activate the next section in order, S3. By following any selected signal combination through the switching circuit, it will be seen that the switching circuit does accomplish the desired purposes. For example, with absence of signal on all high order input terminals, the high order relays R6, R5 and R4 are unoperated, and a completed circuit from the battery 30 to lamp L1 may be traced through relay contacts 32, 34 and 36. With a signal present at only T5 and T4 (decimal equivalent 24), only relays R5 and R4 are energized, and a circuit from the battery 30 to lamp L4 is completed through relay contacts 32, 37 and 38, thus to light lamp L4 and activate the response section S4 indicative of the decimal 24. If a signal is present only at terminal 6 (decimal equivalent 32), only relay R6 will be operated, and lamp L5 will be energized through contacts 40, 42 and 44.

From the above examples, it will be seen that the "base" decimal equivalents of the eight response sections and their associated lamps are as follows:

| Response Section of Receiver 12 | Lamp | High Order Binary Bits | Decimal |
|---|---|---|---|
| S1 | L1 | 000 | 0 |
| S2 | L2 | 001 | 8 |
| S3 | L3 | 010 | 16 |
| S4 | L4 | 011 | 24 |
| S5 | L5 | 100 | 32 |
| S6 | L6 | 101 | 40 |
| S7 | L7 | 110 | 48 |
| S8 | L8 | 111 | 56 |

The adjacent response sections of receiver 12 are decimally eight apart, and to obtain the analogue or decimal of the lower order digits which lie between the "jumps" of eight between adjacent response sections, the particular response section which is activated is scanned in response to the low order digits to find within the activated response section the position which is indicative of the low order digit bits.

The latter operation is effected by receiver 14, whose output responses drive a scanner 46 with an indicator that scans or traverses the activated response section of receiver 12 and stops at a proper one of eight response stations within the extent of the activated response section. Each such response station is indicative of a different one of the possible combinations of the low order digits.

More specifically, the receiver 14 comprises a stepmotor 48 with an output which has eight response positions, one for each permutation of the three low order digits arriving at the terminals T3, T2 and T1, of the low order input 21. The stepmotor 48 includes a magnetic armature 50 mounted for rotation within a stator 52 which has eight inwardly extending magnetizable poles P1, P2, P3, P4, P5, P6, P7 and P8. The armature has magnetic polarities which may be as indicated, and which may be obtained by permanent magnetization, or other suitable means. Positioning of the armature 50 is effected by selectively magnetizing any pair of oppositely located poles to subject the armature to magnetic poles of opposite polarity at diametrically opposite sides of the stator. The armature under such influence will snap into the position wherein its poles will be aligned with the stator poles of opposite magnetic polarity. For example, if stator poles P1 and P5 are energized so that P1 is a north pole and P5 is a south pole, the south pole of the armature will be attracted to P1 while the north pole of the armature will be attracted to P5. The reverse of the latter armature position may be obtained by reversing the magnetic polarity of poles P1 and P5.

Each stator pole is provided with two coils, one coil on each pole being connected in circuit with one coil on the diametrically oppositely located pole to produce a particular magnetic polarity relationship when these interconnected coils are energized, while the other coils on these oppositely located poles are connected together to provide the reverse magnetic relation when the latter coils are energized. The associated coils on oppositely disposed poles for effecting a particlular polarity relation may be termed the north and south coils for producing a particular armature position, and these associated coils of each of the pole pairs are for convenience indicated under the same winding designation, but modified with a suffix N or S to indicate the polarity (north or south) induced by the respective windings when energized.

To avoid congestion of the drawing, only the coils on oppositely located poles P3 and P7 are shown in their position on these poles, it being understood that all the poles have two coils on each. These coils while not shown on the stator poles are clearly indicated in a coil circuit 60 where they are shown connected to the output circuit of switching means 18. The association of the coils in the coil circuit to the stator poles is shown in the table of FIG. 5. It will be apparent from the table and the coil circuit that for every pair of oppositely located poles there are two possible armature positions. For example, series connected coils W1N on pole P1 and W1S pole P5, when energized induce at the pole faces of P1 and P5 north and south poles respectively and align the armature 50 with these poles, with the south pole of the armature at pole P1. On the other hand when series connected coils W5S and W5N on poles P1 and P5 are energized P1 becomes a south pole and P5 a north pole thus aligning the armature with these poles but with the north pole of the armature at P1.

Continuing the example of the natural binary code, the digits received at the respective low order input terminals have the following decimal equivalents: T3—4; T2—2; and T1—1. The order to handle the eight possible combinations of the three low order digits, the stepmotor is designed to provide eight armature positions. Circuits for effecting these positions may be traced through the switching system 18 for any particular arrangement of bits of information arriving at the low order input terminals. For example, if there is presence of signal at only terminal T2 (decimal 2), then only relay R2 is energized and a circuit is completed from a battery 61 to windings W3N and W3S through contacts 62, 64 and 66 making poles P3 and P7 north and south poles respectively, thus forcing the armature into a position aligned with poles P3 and P7, the south pole of the armature pointing to pole P3. In another random example, when presence of signal occurs only at terminals T3 and T1, only relays R3 and R1 are operated and a circuit is completed from the battery 61 to windings W6N and W6S through relay contacts 68, 70, and 72 to force the armature into alignment with pole piece P2 and P6, the south pole of the armature pointing toward pole piece P6. Similarly, the effect of other permutations of the low order digits may be traced through the switching circuit 18 and coil circuit 60.

The scanner 46 moves an indicator along the activated response section, stopping at one of a plurality of scanning stations within the extent of the response section. Each scanning station is indicative of a different one of the permutations of the low order digits. For the three lower order digits there are eight possible combinations and therefore eight scanning stations. In the embodiment shown, there are a plurality of indicators, one for each response section, in the form of equally spaced radial slits 73 in a circular scanning mask 75, which slits are moved in unison across the response sections by rotating the mask in response to the stepmotor armature. The light of the activated section shining through the slit in front of it provides a greater visual contrast than that existing at the slits along the unlighted response sections. Thus the slit along the lighted section provides a distinctive indication and is the significant indicator.

As hereinbefore stated, the output responses of the stepmotor 48 are employed to scan the coarse indicating response sections of receiver 12 to obtain a fine indication of the digit arrangement at the input 10. There being eight permutations of the three digit low order input, each response section of receiver 12 is divided into eight equal divisions which correspond to the eight scanning stations of the scanner, each of the latter being responsive to a different one of the eight possible output positions of stepmotor 48. The divisions of the response sections may be indicated on a scale 74 attached to the housing 26, and may be in any desired form of indicia, such as degrees, decimal equivalents, etc. In the example shown, the scale indicates decimal equivalents of a six-bit natural binary code. Thus response section S1 is indexed in units from 0–7, section S2 in units from 8–15, section S3 in units from 16–23, etc. The scanning ratio is one full excursion through all the armature positions representing all the permutations of the low order digits to one full excursion across the extent of a response section of the receiver 12. Thus movement of the step-motor armature from one armature position to an adjacent position should move the scanning indicator $1/n$th of the extent of a response section, where $n$ is the number of armature response positions. For the particular embodiment illustrated, $1/n$th equals ⅛ of a response section, or one of the eight divisions shown. In the particular case shown, where full excursions through all of the response sections and response positions on both receivers utilizes 360°, a ratio of 8 to 1 of the armature movement to scanning movement will effect the desired result. As shown in the drawing, this is accomplished by coupling the armature shaft 76 through 8 to 1 reduction gears 78 to a shaft 80 to which the scanning mask 75 is fixed.

As hereinbefore stated, the mask 75 is provided with eight equally spaced slits 73. The spacing between centers of adjacent slits is the same as that between centers of adjacent response sections. In the example shown this is $$\frac{2\pi}{8}$$

radians. The provision of the same number of slits as there are response sections allowed the apparatus to accommodate "jumps" of any degree in the input code. Because the indicators operate in unison, each will be in the same relative position along a different response section, for any given scanning response station. For example in FIGS. 2 and 3 all the slits 73 are at the third division (from the left) of the response sections which the respective slits are traversing. One slit is at scale division 2, the next slit (clockwise) is at 10, the next at 18, etc. This reflects the third scanning response station. However, since only one response section is lighted at any given time, only the slit in front of the activated response section will have light shining therethrough and thus act as the indicator at the particular time.

As an example of the operation of the apparatus let be assumed that the six digit natural binary information 101010 is present at the input terminals. This will place a signal only at terminals T6, T4 and T2 thus to operate only relays R6, R4 and R2. As a result a circuit from battery 30 will be completed to lamp L6 through relay contacts 40, 42 and 84, thus activating response section S6 whose base decimal equivalent is 40. In the meantime, a circuit from battery 61 will be completed to coils W3N and W3S through relay contacts 62, 64 and 66, thus making P3 a north pole and P7 a south pole and thereby snapping the armature 50 into alignment with poles P3 and P7, with the south pole of the armature at P3. This is the armature position illustrated in the drawing. In response to this armature position, the scanning disc is moved so that all the slits are at scanning station three as shown in the drawing (FIGS. 2 and 3), reading the scale from left to right. However, the only distinctive visible indication will be the light through the slit in front of lighted response section S6, and it will point to the 3rd division of that section or decimal 42 (equivalent to natural binary 101010). It should be noted that the first division of section S6 is the decimal 40.

In another example of operation the binary information 000000 will light lamp L1 and move the scanner to scanning station one thus orienting all the slits to the 1st division of each response section. The only distinctive indication will be the light througih the slit in front of response section S1 which slit will be pointing to 0 on the scale. In a further example binary 001000 will activate section S2 and move the scanner slits to the scanning station one, the distinctive indication being given by the slit in front of section S2 which slit will be pointing at 8. Taking a higher number, binary 110110 will light L7 (decimal base 48) and move the indicating slits to the seventh scanning station, the slit along the activated response section S7 providing the distinctive indication at the scale division 54.

The illustrated embodiment may be generally formulized as follows:

$x$=number of most significant digits.

$y$=number of least significant digits.

$R$=radix of code.

$R^x$=number of possible permutations of most significant digits.

$R^y$=number of possible permutations of least significant digits.

High order or 'coarse" receiver 12 has $R^x$ number of response sections.

Low order or "fine" receiver 14 has $R^y$ number of response positions.

The scanner has $R^y$ number of response stations within the extent of a response section of the coarse receiver. The scanner also has $R^x$ number of "ganged" indicators, one for each response section at any given time.

Adjacent scanning response stations are $1/n$th of a response section apart and represent the monotonic change at the low order input from one binary number to the next in numerical order in either direction where, $$\frac{1}{n}=\frac{1}{R^y}$$

Either monotonic changes or "jumps" in the input code are acceptable and accommodated by the illustrated apparatus.

Although the examples given relate to a six-bit natural binary code input, the invention can accommodate a smaller or larger number of digits, and code structures other than the natural binary.

While the invention has been described in its preferred embodiment, it is to be understood that the words which have been used are words of description rather than of limitation and that changes within the purview of the appended claims may be made without departing from the true scope and spirit of the invention in its broader aspects.

What is claimed is:

1. Converting apparatus comprising an input for receiving an array of digital information bits including a group of most significant digits and a group of least significant digits, first receiver means having an output with a plurality of response sections, means for selectively lighting said sections each in response to a different combination of the digits of said first group, second receiver means having an output with a plurality of response positions, means for selectively obtaining said positions each in response to a different combination of the digits of said second group, and a plurality of indicators simultaneously responsive to the output of said second receiver means for scanning said sections, each indicator being operable to scan a different one of said sections at any given time, said apparatus being adapted to provide greater contrast between a lighted section and said indicators than between an unlighted section and said indicators whereby a distinctive indication is given only by the indicator that is scanning whichever section is lighted at any given time.

2. Converting apparatus comprising means having a plurality of response sections consecutively arranged along a course, each section being adapted to present a lighted extent along said course in response to a different one of the permutations of one group of digital information bits, and scanning means including an element masking said sections, said element having a plurality of apertures along said course, each scanning a different one of said sections at any given time, said scanning element being movable along said course with respect to said sections and having a plurality of response stations along said course each responsive to a different one of the permutations of another group of digital information bits, all of said response stations being consecutively arranged within an excursion distance of said movement that is equal to the extent of a response section.

3. Converting apparatus comprising means having a plurality of response sections consecutively arranged along a course, each section being adapted to present a lighted extent along said course in response to a different one of the permutations of one group of digital information bits, and scanning means including an element masking said sections, said element having a plurality of apertures along said course, each scanning a different one of said sections at any given time, said scanning element being movable along said course with respect to said sections and having a plurality of response stations along said course each responsive to a different one of the permutations of another group of digital information bits, the distance between adjacent response stations being $1/n$th the extent of a response section, where $n$= number of different permutations of said other group of bits.

4. Converting apparatus comprising input means for receiving first and second groups of digital signals, receiver means with a plurality of response sections, means for selectively lighting each of said sections in response to a different one of the permutations of the first group of digital signals, a visual indicator comprising a movable mask for masking whichever section is lighted, said mask having an aperture therethrough, means responsive to the second group of digital signals for moving the mask to index the aperture at anyone of a plurality of positions along the lighted section, each position being selected in response to a different one of the permutations of the latter signals.

5. Converting apparatus comprising input means for receiving first and second groups of digital signals, receiver means with a plurality of response sections, means for selectively lighting each of said sections in response to a different one of the permutations of the first group of digital signals, a visual indicator comprising a movable element masking said sections, said element having a plurality of apertures therethrough one in front of each section, means responsive to the second group of digital signals for moving said element along said sections to index the apertures at anyone of a plurality of positions, each position being selected in response to a different one of the permutations of the latter signals.

6. A converter comprising input means for receiving first and second groups of digital signals, means defining a plurality of consecutively arranged adjacent chambers all having an open side fronting in a common plane, each chamber having therein an electric lamp, means for energizing each lamp in response to a different one of the permutations of the first group of digital signals, an element masking the open sides of the chambers and movable in said plane to traverse the open sides, said element having a plurality of indicating apertures therethrough, one in front of each chamber, means responsive to the second group of digital signals for selectively moving said element to any one of a plurality of consecutive traverse positions, each being selected in response to a different one of the permutations of the second group of digital signals.

7. Converting apparatus comprising means having a plurality of response sections each operable to be activated with luminous energy in response to a different combination of the bits of a first group of digital information bits, and means for scanning whichever section is activated, the latter means having a plurality of response stations along the extent of a response section each responsive to a different combination of the bits of a second group of digital information bits, the latter means having indicating means for cooperating with the activated section to give a distinctive indication of whichever response station is responding at any given time.

8. Converting apparatus comprising first receiver means having a plurality of response sections each operable to be lighted in response to a different combination of the bits of a first group of digital information bits, second receiver means having an output with a plurality of response positions each responsive to a different combination of the bits of a second group of digital information bits, and means responsive to the output of the second receiver for scanning whichever one of said sections is lighted, the latter means having light responsive indicating means.

References Cited in the file of this patent

UNITED STATES PATENTS

| | | |
|---|---|---|
| 2,736,017 | Marlowe et al. | Feb. 21, 1956 |
| 2,769,968 | Schultheis | Nov. 6, 1956 |
| 2,779,539 | Darlington | Jan. 29, 1957 |
| 2,899,673 | Reiner | Aug. 11, 1959 |